United States Patent

Kunert

Patent Number: 5,514,428
Date of Patent: May 7, 1996

[54] SPACER FABRIC WITH INTERCONNECTED RIB FIBERS IN GLAZING ELEMENT

[76] Inventor: Heinz Kunert, Am Krieler Dom 23, 50935 Köln, Germany

[21] Appl. No.: 302,791
[22] PCT Filed: Jan. 11, 1994
[86] PCT No.: PCT/EP94/00068
§ 371 Date: Sep. 12, 1994
§ 102(e) Date: Sep. 12, 1994
[87] PCT Pub. No.: WO94/15784
PCT Pub. Date: Jul. 21, 1994

[30] Foreign Application Priority Data

Jan. 11, 1993 [DE] Germany ............ 43 00 480.6

[51] Int. Cl.$^6$ ............ C06B 3/24; C06B 3/26; C06B 3/28
[52] U.S. Cl. ............ 428/34; 156/109; 52/786.1; 52/786.11; 52/786.13
[58] Field of Search ............ 52/790, 788, 789; 428/34; 156/109

[56] References Cited

U.S. PATENT DOCUMENTS

| | | | |
|---|---|---|---|
| 4,235,048 | 11/1980 | Gillery | 52/789 |
| 4,256,808 | 5/1981 | Roy et al. | 52/789 |
| 4,259,135 | 3/1981 | Kulla | 428/34 |
| 4,335,166 | 6/1982 | Lizardo et al. | 52/789 |
| 4,623,592 | 11/1986 | Daudé et al. | 52/789 |
| 4,652,472 | 3/1987 | Davies | 428/34 |
| 4,680,206 | 7/1987 | Yoxon et al. | 52/788 |
| 4,798,695 | 1/1989 | Redel | 52/790 |
| 4,989,384 | 2/1991 | Kinghorn et al. | 52/788 |
| 5,052,164 | 10/1991 | Sandow | 52/790 |
| 5,217,764 | 6/1993 | Eich | 52/790 |
| 5,240,533 | 8/1993 | Böttger et al. | 156/148 |
| 5,336,354 | 8/1994 | Looi et al. | 52/789 |
| 4,9634,206 | 10/1990 | Shaklette et al. | 52/789 |

FOREIGN PATENT DOCUMENTS

| | | | |
|---|---|---|---|
| 0472499 | 2/1992 | European Pat. Off. | 428/34.1 |
| 2132889 | 1/1973 | Germany | 52/790 |
| 2457475 | 6/1976 | Germany | 428/34 |
| 3610135 | 10/1987 | Germany . | |
| 3723681 | 1/1989 | Germany . | |
| 0923204 | 4/1993 | United Kingdom | 428/34 |

OTHER PUBLICATIONS

Klindt/Klein, "Glas als Baustoff" (1977).

Primary Examiner—Robert E. Sellers
Attorney, Agent, or Firm—Sixbey, Friedman, Leedom & Ferguson; Gerald J. Ferguson, Jr.

[57] ABSTRACT

The glazing element in accordance with the invention comprises in its simplest form a pane and a textile spacer fabric arranged at the covering surface of the pane. The spacer fabric comprises at least two covering layers, which are connected together by rib fibers extending approximately transversely in relation to the panes. The glazing element in accordance with the invention possesses thermal insulating properties and may be utilized as safety glass, more particularly for roofs or overhead glazing arrangements.

47 Claims, 2 Drawing Sheets

SPACER FABRIC WITH INTERCONNECTED RIB FIBERS IN GLAZING ELEMENT

Glass panes are considered to be safety glass which if fractured do not lead to any substantial injuries. So-called single pane safety glass, also termed toughened glass, and two-pane glass have long been in existence as safety glass.

In the case of the former protection against injury is possible because the glass has been subjected to heat treatment producing pretension so that on fracture it breaks down into a multiplicity of small, blunt fragments incapable of causing injuries. Composite safety glass is made up of two sheets of glass with a plastic film therebetween which bonds the two glass sheets together. The protection against injury is provided because when the glass sheets fracture the resulting sharp glass fragments remain adhering to the bonding layer.

Such monolithic sheet has a high heat transition coefficient or k coefficient of almost 6.0 W/m$^2$K. Only an adjacent air cushion is able to reduce this high heat transition coefficient. To this extent safety glass, which has to perform a thermal insulating function, normally necessitates a two sheet structure along the lines of an insulating glass element.

An insulating glass element composed of safety glass is expensive, more particularly when composite glass is employed, something which is desirable in the case of insulating glass for glazing in facades and roofs at least for the pane bordering on the room. In the case of the use of single pane safety glass there is a danger of injury on fracture owing to a shower of falling glass crumbs which are frequently still held together as clumps. Therefore in the case of insulating glass elements for glazing roofs, if employed at all, such glass is only arranged on the outside.

In the case of the use of thermal insulating glass with a safety function for facade glazing and as a glazing structure for roofs the weight of the glass is more particularly a problem. Massive, expensive supporting and frame structures are necessary. In the case of glass thicknesses of 5 to 6 mm of each individual sheet an insulating glass element will have a weight of 25 to 30 kg/m$^2$.

The German patent publications DE 1,073,164 B and 7,315,974 U disclose insulating glass with foam bodies filling the intermediate space and, respectively, sheets of hollow glass or plastic fibers arranged parallel to the covering glass surfaces. Owing to a reduction of thermal conduction by convection such interlayers increase the insulating effect and simultaneously serve to prevent dazzle because of the scattering of light. Such elements do not have any safety properties. The interlayers are fragile in structure. They are hardly in a position of transferring forces from the one cover sheet to the other one. Furthermore, there is no force transmitting connection with the cover sheet.

The German patent publication DE 3,432,761 discloses an insulating glass element which is more particularly to have safety glass properties. This is to be achieved by a connection of one or both glass sheets with a transparent, fragment binding plastic layer. However owing to the coarse, thin-walled foam material interlayer of low rigidity and of organic material this insulating glass structure lacks both the structural strength and rigidity necessary for roof and facade glazing and also the resistance to aging. Thus more particularly in the case of the employment of weight reducing thin glass, which is so advantageous, such elements are neither suitable to withstand heavy roof loads nor to span large distances.

Having regard to the lack of structural strength and of inherent stability of the foam material interlayer there is furthermore a lack of sufficient resistance to penetrating forces. Such glass elements are unable to offer sufficient resistance to the impact of massive falling bodies, this constituting a disadvantage for roof and facade glazing arrangements. Owing to the insufficient resistance to falling bodies of the interlayer there is furthermore no guarantee of sufficient resistance to persons attempting to break into or out of a building.

The bonding of glass panes with foam slabs which owing to the necessary transparency to light comprise relatively large bubbles, is admittedly possible using an additional plastic film, but however then only the surfaces of such foam slabs are bonded. Owing to the extremely thin walls of the brittle material neither thrust nor compressive forces may be taken up or transmitted by the foam material interlayer.

A force transmitting connection of the glass panes with each other is only possible using an edge bonding rib, which may also be provided alternatively as an edge sealing rib. Edge seal means are certainly necessary in the case of foam material interlayers, since otherwise there will be a diffusion of water vapor into such sheets, something which is responsible for a substantial reduction in the thermal insulating effect and to cloudiness in the interlayer.

If the interior space of the sheet is sealed off from the atmosphere the bonding of the pane with the interlayer and the brittle foam structure itself is permanently damaged by the inward and outward bulging of the sheet as caused by the differences in pressure, due to the changes in temperature, of the enclosed volume of air. Despite this, experience has so far been that, owing to substantial thermal loads during heating up in the summer of approximately 100° C. and the insufficient resistance to UV radiation, translucent plastic structures employed as interlayers suffer rapid embrittlement and lose their dimensional stability.

In the case of the insulating glass element in accordance with the German patent publication DE 3,432,761 the starting point is covering glass panes of extremely thin flat glass, preferably with a thickness of approximately 1.5 to 2 mm. Roofing sheet elements must however be statically in a position of resisting additional loads such as those of snow, as well as suction effects due to gusts.

Owing to such loads wire reinforced glass with a minimum thickness of 7 mm is with good reason specified as a constructional standard for overhead lights. In the case of the employment of insulating glass a design is required which on the outside comprises a sheet of toughened glass with a thickness of 5 mm and on the inside a composite glass sheet also with a thickness of 5 mm.

In the case of the above mentioned insulating glass sheet only the thin cover pane of flat glass of preferably 1.5 to 2 mm in thickness takes part in withstanding the load. The interlayer of acrylic foam is incapable of either resisting loads or transmitting forces to the lower cover glass pane. For this purpose it is necessary to provide an interlayer of rigid material, which is joined to the two sheets of glass in a force transmitting fashion. A glass sheet with a thickness of 2 mm or even of 3 mm will probably bend under load when employed for large spans and owing to the low tensile strength of the glass would fracture. This applies for insulating glass elements as glazing for roofs generally. The capacity to take up roof loads is in this case only dependent on the flexural rigidity of the upper cover sheet.

In an article by F. B. Grimm entitled "Glas als tragender Baustoff: Glassandwich-Elemente" published in glass+rahmen (1991) 19, pages 1020 through 1028, glazing elements are described, in which the force transmitting connection by the two insulating glass sheet is achieved either by mechanically connected or thrust transmitting, bonded on spacers. In the former case the pins welded to the glass sheet fit into holes, which are provided in the spacers. As an alternative it is possible for the glass sheets to be connected together by countersunk head screws with each other, such screws extending through drilled holes and being secured in suitable threaded holes in the spacers.

In the second case the spacers have a space for receiving a silicone adhesive, the spacer completely surrounding the adhesive and therefore preventing changes in form when thrust loads are applied. As a third design a sandwich core is suggested made up of two sheet parts able to be plugged together and which is completely bonded to the two glass sheets over the full surface thereof.

Not one of the three above mentioned designs can be said to be an element with pronounced thermal insulating properties, or at any rate not with properties better than those of normal double sheet insulating glass. The spacers proposed, whatever the form thereof, ultimately constitute cold bridges in all three systems owing to the wall thickness thereof, such bridges constituting a hinderance to achieving a substantial thermal insulating effect owing to the thermal conduction taking place through them.

This furthermore applies for the case of filling of the space between the sheets with granular aerogel or other foam materials with an extremely low thermal conductivity. The more effective the prevention of the passage of heat through the element owing to the foam materials or aerogel pellets surrounding the spacer elements, the greater the thermal potential or the quantity of heat, which flows through the cold bridges. Such cold bridges have an extreme effect in the case of evacuated spaces between the sheets. The thermal insulating effect is here practically the same as that of conventional plastic sheets connected together by bridges.

In order to achieve a heat transition coefficient (k) of less than 1 $W/m^2K$, support elements with extremely low surface fractions with wall thicknesses in the micron range are necessary and additional measures have to be adopted in order to prevent thermal transition due to radiation.

In this connection it is to be pointed out that overhead lights more particularly have to possess high thermal insulation properties, not only owing to temperatures, which are, as is known, higher in the upper part of a room. In present day constructional physics the much greater radiation of heat into the heavens of inclined sheet surfaces is hardly taken into consideration.

Such sheet surfaces are always in radiative exchange with the sky, which dependent on the amount of cloud will have a temperature which is between 10 and 30K below that of the ambient atmosphere. Roof or overhead lights must therefore in all cases be designed to have a high thermal insulation effect, the reduction in emission being a particularly important aspect.

As regards the safety features the two first designs mentioned in the above noted article require composite glass increasing the weight of the element.

Furthermore the ability of all glass sandwich elements mentioned in this article, when subject to flexural loads, to transmit thrust forces and, in a force transmitting manner, loads to the opposite glass sheet by means of the proposed spacers is limited.

The ability of sheet glass to take up flexural loads, as occur in the case of overhead lights owing to the given inherent weight loads and roof loads to be additionally taken up, is known to be substantially reduced at the outset owing to the low tensile strength which in turn is due to the micronotches always present on the glass surface and furthermore microcracks. As is generally known, glass is a material which reacts extremely sensitively to extremely great, punctuate stresses, which are inter alia caused by strain maxima owing to rigid connections.

An aspect which is not clearly expressed in the above mentioned article is the increased liability to fracture in the case of a punctuate or locally limited cancellation of the pressure stresses owing to imposition of tensile forces at the end surfaces of glass sheeting subject to a flexural load. This decrease of thrust forces (which prevent the breaking open of micronotches and cracks) however takes place with the proposed arrangement of spacers with welded on pins or adhesively applied annular spacers owing to the punctuate or locally produced tensile strains.

If these spacers are furthermore applied to the end surface of the sheet subjected to flexural strains, then even tensile strains occurring at low degrees of flexure are sufficient to cause glass fracture owing to microcracks.

In order to provide a remedy within limits thicker sheet glass is required, the inherent weight of the glazing arrangement—the weight of both sheets are involved in the load—hardly allowing the use of such elements, as is shown by practice, in the case of a glass arrangement with a considerable span.

In the case of rigid bonding of a plastic sheet with a glass sheet, which is able to transmit thrust forces, however owing to the bond compressive strains are neutralized by locally applied surface strains on the surfaces of the sheet so that it is certainly not possible to speak of a compensation of the liability to fracture of the reinforced glass sheet.

Furthermore the poor resistance to aging of plastic sheet owing to the continuous UV irradiation and furthermore the high degree of heating of the sealed intermediate space of possibly up to 100° C. between the sheets is disadvantageous. Premature embrittlement occurs more particularly in the case of plastic sheets, which are subject to continuous loading. Brittle fracture of sheets owing to additional flexural loading leads as a rule simultaneously to fracture of the glass pane rigidly connected with such sheet owing to the fracture strain peaks transmitted to the end surface of the glass sheet.

The above discussion of shortcomings of systems which have been developed so far leads towards the object of the invention, namely the development of a translucent or partly transparent glazing element, which is characterized by good thermal insulation properties and furthermore as safety glass has the property of resistance to penetration and the ability to bind fragments.

In order to achieve the said object the invention contemplates a glazing element with at least one pane and a layer which extends over one of the covering surfaces of the pane for at least a substantial part of its area, made up of fibers extending in parallelism to the covering surfaces of the pane, characterized in that this fiber layer is constituted by a covering coating of a first spacing fabric impregnated with resin and is connected with the covering surface of the pane in a force transmitting manner, the spacer fabric having at least one second covering layer opposite to the first covering layer and the covering layers are connected with one another by rib fibers which extend transversely to the same and after the curing of the resin are flexurally stiff and elastic fibers.

The invention as defined in the claims is therefore based on the notion that two transparent panes are to be connected together by spacer fabric by means of the flexurally stiff rib fiber structure thereof in a force transmitting fashion.

Spacer fabrics of the type employed here have already been proposed. They generally consist of two covering layers of a textile material, more particularly of glass, synthetic resin or carbon fibers or however furthermore in accordance with specific requirements, of blends of such materials, which are connected together by fibers entering perpendicularly or at an angle, that is to say so-called rib fibers.

These rib fibers, which may be arranged differently dependent on the requirements, keep the two fabric layers at a predetermined distance apart like a framework. The rib fibers in this case constitute rows of ribs standing substantially perpendicularly on the covering layers like a loop structure, the covering layers being if desired connected together additionally by thread structures extending diagonally in relation to the rows of ribs. Such spacer fabrics have so far been more especially utilized as spacer layers for the production of various fiber composite materials.

Spacer fabrics are as a rule impregnated with resin when they are processed. The impregnation with resin may take place both by dipping in the resin composition or furthermore by even application on the fabric. The excess resin is then expressed between films or rolls. After the impregnation with resins the rib fibers will return to the original level automatically without an adjuvant and render possible, owing to the defined position thereof, distances from the covering layers, which can be set as desired. The arrangement and level of the fibers determine the strength of the sandwich structure resulting after curing of the resin layers.

Having regard to the requirement for the maximum possible flexural rigidity for the production of the glazing arrangements in accordance with the invention it is preferred to utilize spacer fabrics with covering layer and rib fibers of E glass fibers. Preferably the rib fibers in the spacer fabrics are so arranged that they intersect.

The mechanical loads are distributed by the elastic rib fibers evenly and without any local stress, over the surface of the pane. Despite their elasticity the rib fibers constitute a rigid, thrust resistant connecting means for the panes, since with the intersecting arrangement there is a triangulation effect leading to a generally rigid buttressing action. It is an advantage if the rib fibers are connected together at their points of intersection by the solidified resin so that the triangulation effect can be enhanced even more.

The rib fibers should have a mean fineness in a range of approximately 20 to 80 tex and should be arranged with a density of between approximately 10 and 60 fibers per $cm^2$. The fibers of the spacer fabric should be constituted at least partly of hollow fibers.

In order to be stable such a glass sheet structure does not require any additional supporting frame. Owing to the surface parts, which are rigidly and force transmittingly connected together the statics of such a structure go further than a superimposed and supporting frame means. Owing to the high modulus of elasticity of the glass the loads are taken up by the entire surface of the pane.

The process of manufacture for the glazing element in accordance with the invention may be as follows:

This process comprises the steps of placing a resin impregnated spacer fabric having at least two coveting layers and rib fibers extending transversely in relation to the covering layers so as to cover a major surface of a transparent pane to produce a laminated body, compressing the laminated body in a pressing mold so as to adhesively bond the pane to one of the covering layers of the fabric, whereafter the pressing mold is at least partially opened and the resin impregnated in the spacer fabric is cured. During the opening step, the pressing mold is opened a graduated amount until the desired distance is reached between the covering layers. At least one partly resin impregnated spacer fabric having at least two covering layers and rib fibers extending transversely in relation to the covering layers is cured and at least one spacer fabric is placed between two panes or sheets in a distance determining manner. The panes or sheets with the spacer fabric therebetween are then pressed with an adhesive bonding effect.

The spacer fabric layers are impregnated with suitable resins and laid on the covering surface of the pane to be provided with the spacer fabric or, respectively, between the pair of panes to be joined together. The "sandwich structure" is thereafter placed in a press in order to ensure a complete wetting of the pane surfaces with the viscous resin composition applied to the fabric and in order to simultaneously secure a reliable adherence of the resin. On opening the press mold the rib fibers, which were pressed out flat in the course of the pressing operation, re-erect themselves owing to the restoring forces and become rigid owing to the resin material adhering like a size.

It is an advantage if after the pressing operation there is a graded lifting of the covering layers or, respectively, of the panes from each other using compressed air or specific suction devices, until the desired distance between the covering layers is reached. It is preferred for the curing process of the resin incorporated in the glass fabric to be accelerated by the addition of suitable chemical substances and/or by the supply of energy, more particularly heat.

The process of production may be performed in such a manner that the fibers to be processed already bear a resin size, which after the introduction into the press is suitably re-activated. This method is preferably to be performed when different resins or adhesive materials to be cured are to be utilized for the covering layers and for the rib fibers.

For processing it is mainly possible to utilize epoxy, polyurethane, phenol and polyester resins, which adhere satisfactorily to the glass yarn, which is preferably provided with silane sizes. For ensuring a reliable adhesion of the glass panes on the covering layers polyurethane resins are more particularly suitable.

The fabrics may be designed with rib fiber lengths of up to 16 mm. If the bonding process is carefully performed and if specific measures are taken for additionally reinforcing the restoring forces of the rib layers the full spacer width for the pair of panes is achieved. In the case of the use of suitable polyurethane resins, possibly in connection with a primer material suitable for the system, the reliable and permanent bonding of the glass panes on the covering fabric layers is ensured.

In the case of the glass sandwich element in accordance with the invention local stress peaks on the glass pane are prevented. Owing to the elastic covering layers of the spacer fabric no stress peaks are transmitted via a thin resin layer when the fabric is joined to the glass pane. Furthermore the transfer of the force to the spacer fabric takes place without locally occurring stress maxima owing to the fiber structure of the covering layers. The spacing glass fiber structures are extremely elastic while having a high flexural rigidity. The flexural loads are taken up throughout the thickness of the fiber structure evenly over large areas and transmitted to the opposite pane. Owing to this it is possible for the glass pane to be designed as a thin structure with an extreme saving in weight, since the pane structure ultimately constitutes a pseudo-monolithic element connected in a force transmitting manner.

In this glass element a special mechanism leads to astonishingly high flexural rigidities. On curing the resin tensile forces are applied to the spacer structure. The interlayer connected with the glass panes then acts in a force transmitting manner like the reinforcement of a prestressed concrete slab or a core layer of a glass sheet with a thermally applied pre-loading effect.

Owing to the lead of the cure of the resin coating applied to the fabric layers, which ensure the adhesion of the covering layers to the glass panes, in relation to the resin coating of the rib fibers and furthermore the marginal zones of the sandwich element the designer is in a position of reinforcing this mechanism in a systematic manner as desired. Such a measure is therefore proposed as a method procedure.

As a result of the high modulus of elasticity of glass fibers the glass pane structure leads to an extremely high resistance to thrust and compressive loads in a direction perpendicular to the layer structure. The high flexural rigidity of the rib fibers and the density thereof, and the arrangement of the surface in a regular structure endows the "pane sandwich" with the dimensional stability and structural strength of a solid glass body. Owing to its structural strength properties it is possible to utilize such a glazing element and more particularly furthermore a twin or multiple layer insulating glass element without additional stiffening frame means for a construction in the manner of a monolithic pane of glass. From the point of view of weight in this case practically the glass covering panes are alone significant.

A particular advantage is furthermore the dimensional stability of such insulating glass structures, which when the pressure of the atmosphere increases or decreases, do not (like the conventional insulating glass panes) depart somewhat from the flat form. To this extent there are no longer the loading effects, occurring with conventional insulating panes of glass due to such pressures, at the edge joints and damage to the seal connected with them.

An advantage directly resulting from the sandwich structure of the glazing element in accordance with the invention is the possibility of having a vacuum in such elements, that is to say evacuation of the interior space in them. For this purpose it is merely necessary to provide a diffusion-proof marginal seal. Naturally in the case of such pane elements furthermore any gas fillings reducing thermal conduction are of very much greater stability.

The glazing element in accordance with the invention possesses the advantage that it is resistant to aging without any limitation and furthermore withstands, practically again without limitation, intensive thermal, atmospheric and solar radiation effects. Mechanical forces have little effect on it, because it is sturdy and dimensionally stable. The glazing element in accordance with the invention can be employed for roof and facade glazing and is in the position of resisting high loads and spanning large areas. It acts as an effective anti-dazzle means and a glass providing a guarding effect against sunlight, as acoustic insulation and may be furthermore employed as glass preventing breaking out or breaking in. Lastly, in the simplest form, it is to be employed at substantially lower expense than known insulating glass elements while having a high thermal insulation effect.

Further advantageous developments and convenient forms of the invention will be understood from the following descriptive disclosure in conjunction with the accompanying drawings.

Figure 1:
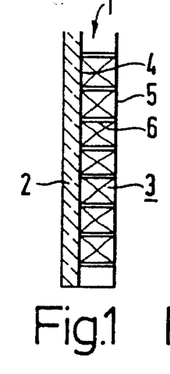
FIGS. 1 through 12 illustrate various different embodiments of the glazing element in accordance with the invention as seen in cross section.

FIG. 1 shows a glazing element 1 in accordance with the invention as a simple embodiment. It comprises an individual transparent pane 2 or sheet and more particularly a pane of glass, to which a spacer fabric 3 is adhered by means of a resin coating applied to its covering layer 4. This resin coating is not illustrated in FIG. 1. The opposite covering layer 5 of the spacer fabric 3 is connected in a force transmitting manner by means of rib fibers 6, which extend transversely in relation to the covering layers 4 and 5, such fibers 6 in this case being represented as rib rows arranged generally perpendicularly on the covering layers 4 and 5. Between the rib rows in this case diagonally extending fiber structures are arranged, which in an advantageous fashion increase the stability of the pane member. Both the covering layers 4 and 5 comprise fibers, which are woven or knitted, extending in parallelism to the covering surface of the pane. The rib fibers 6 themselves are so arranged that they intersect one another. They may be partly or completely surrounded with resin. The rib fibers in this manner constitute rigid, flexurally stiff struts, which endow the spacer fabric in the cured condition with the property of a highly elastic shaped body able to be loaded in all directions, such body constituting in conjunction with the pane 2 a thermal insulating, mechanically resistant glazing element with safety glass properties.

As an alternative to a direct bonding of the spacer fabric 3 on the transparent pane 2 by means of the resin layer applied for stiffening its covering layers 4 and 5 it is possible to have the spacer fabric bonded to the transparent pane 2 or, respectively, to panes arranged on each side by means of adhesive films. In this case it is possible to start with prefabricated, cured spacer fabrics, that is to say fabrics impregnated or wetted with resin and whose covering layers on either side are then provided with an extremely thin resin coating as necessary for stiffening the fibers.

Primarily this offers the advantage that there is a rational prefabrication of the textile spacer fabric sheets, even with adhesive coatings on each side or one side applied previously, in a continuous production process and a respective blank in accordance with the size of the areas to be glazed.

For bonding it is then an advantage to utilize PVB (polyvinylbutyral) material in the form of a viscous liquid, but preferably in a film form. The spacer fabrics provided with films are then placed between the panes to be bonded. The sandwich then firstly runs under a heated roll for fixing and bonding the same and then after this it is processed in an autoclave for ultimate solidification and rendering the film material glass clear and transparent.

Owing to the integration of the adhesive coatings of a visco-plastic material (which is preferably in the form of PVB films with a thickness of approximately 0.37 mm to 0.76 mm) bonded to the textile shaped body the thermal insulating safety glass element is not only able to perform the function of an acoustic insulation pane but furthermore attains the quality of a pane element preventing breaking in or breaking out. The penetration of such a pane element would require much time and force and would not be possible without percussive and cutting tooth tools.

The adhesive films may be monolithic or be part of a composite film structure with further functions, as for example with a selective reflection or absorption filter action for the solar spectrum. More particularly, it would be feasible to employ colored or figured adhesive films for decorative effects or for optically covering the fiber structure of the textile spacer fabric.

For glass elements, and more especially those subjected to high flexural loads, for safety glass elements with thin covering panes and furthermore however for pane elements offering enhanced protection against breaking in or out PVB films or polyurethane films with integrated fiberglass, resin fiber or carbon fiber material in the form of cut mats or endless mats are employed for the bonding of the spacer fabric to the covering panes. The film bonded in a force transmitting manner in the sandwich does not develop any surface stresses. It contributes to the flexural rigidity of the glass element and as an elastic adhesive coating constitutes a buffer acting against any stress peaks occurring where force is taken up by the structure.

Figures 2, 3, 4, 6:
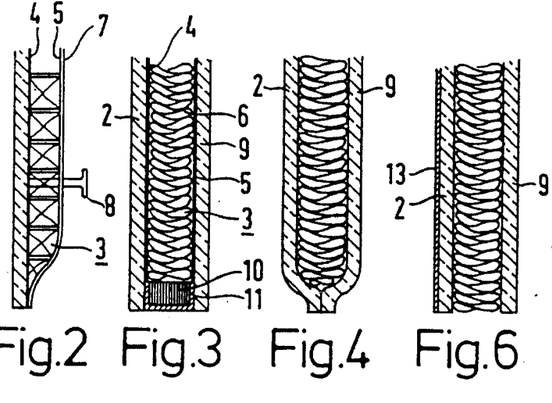

In the case of the embodiment of the invention illustrated in FIG. 2 the covering layer 5 of the spacer fabric 3 comprises a thin, sheet-like coating 7 of a resin as required for the stiffening of the rib fibers 6. By means of an edge-aligned pressing together of the textile covering layers 4 and 5 there is the advantage of a surrounding edge seal.

Such a stiff structure, which is stable as regards its load area and dimensions, is in this simple design as such suitable for use as a thermal insulating security overhead or facade glazing material, the glass covered side having to be on the outside.

Present day cold facades only consist of a glass sheet, normally single pane safety glass, with a ventilation space behind it and arranged at a minimum distance of 2 cm from the load bearing structure of the front of the building. The glass element 1 in accordance with the invention may, in its simplest design with a low weight, transform such a cold facade into a warm facade that is to say a thermally insulated facade with additional acoustic insulation.

A remarkable economic advantage of the glazing element in accordance with the invention is the mechanical attachment means on the face of the building. Whereas in the past the locking pins on the glass panes had to be secured through drilled holes or surrounding frame elements, it is now possible for suitable receiving arrangements 8 for the pins to be embedded in the inner fabric body 3 in a force transmitting manner. The result is then a facade system, in the case of which the panes are mounted with flat alignment as an architecturally perfect structural glazing system covering the outer surface of the building without external attachment and securing elements and without means penetrating the pane members.

Elements of this type, fitted with receiving means in accordance with the proposed attachment system, are furthermore excellent for suspended facades as translucent, thermal insulating wall claddings for the purpose of additional solar heating of the masonry. More particularly in the case of the renovation of poorly insulated masonry in old buildings it is possible to use such suspended glass components to achieve better use of the available thermal energy for the building at a moderate cost.

This structure may also be utilized with advantage to improve upon the thermal insulating coefficient of roof or facade areas already fitted with monolithic panes of glass. The structure is then to be joined to the old, pre-existing glazing adhesively using a resin coating 7 or mechanically using an added frame structure.

FIG. 3 shows a further embodiment of the glazing element in accordance with the invention. In the case of this preferred design both covering coatings 4 and 5 of the spacer fabric 3 are covered with thin-walled glass panes 2 and 9. The edge seal may be produced in a conventional fashion by means of a bonded joint 10. Spacing rib rails are no longer necessary, since the distance between the panes is defined by the spacer fabric and is constantly adhered to and there are no alternating mechanical loads on the sealing rib 10.

There is then the advantage that no highly elastic sealants are required for sealing in order to take up the forces due to deformation of the glass panes, and it is possible to utilize such sealants as offer optimum properties as regards preventing diffusion and providing thermal insulation and adherence of the glass.

Thus it is to be recommended to cover the sealing rib on the side, which is facing or turned away from the interior space, including both side flanks in halves with a thin aluminum film 11, such film being permanently bonded by way of the surfaces laterally engaging the glass panes by means of a diffusion-proof adhesive to the glass panes. Preferably the middle film surface, which is perpendicular to the intermediate space between the glass panes, should be made with folds.

Furthermore in the case of these elements it is an advantage to use the previous technique of producing the edge joint by direct welding of the covering panes 2 and 9, which more particularly in the case of evacuated insulating glass ensures a diffusion-proof edge joint, which however owing to the thermally produced outward bulging of the glass panes does not stand up to the forces exerted on the edge zone. Such a design with panes 2 and 9 welded in the edge zone is depicted in FIG. 4.

It is furthermore possible in a simplified manner, as already mentioned in connection with FIG. 2, to provide an edge seal using the resins stiffening the structure. Finally it is possible to completely dispense with the edge seal, more particularly if one of the panes 2 and 9 is designed to absorb solar radiation. The pane element 1 is then heated when the sun shines on it so that any moisture which may have penetrated into the structure can not remain.

As a solar protective glass, with the absorbing pane arranged on the outside while doing without the edge seal it is possible to obtain the advantage of lesser heating of the pane element by direct removal of heat energy of the absorbing pain by means of convective flow through the lattice constituted by the spacer fabric.

Attempts at the development of insulating glazing systems primarily have the object of optimizing thermal insulation properties. The invention consequently also has the purpose of not only improving mechanical stability but furthermore of providing the glazing elements as insulating glass elements with maximum thermal insulation performance.

In the case of the proposed design with internal spacer fabrics it is possible to have greater pane spacings with generally the same coefficients of heat transition (k values or coefficients) as is the case with conventional insulating glass panes with the same width of the intermediate space. Any possible increase in the values for thermal conduction owing to the rib fibers will tend to be compensated for by the advantage of lower losses due to convection.

Owing to their flexural stiffness and their resistance to compressive loads, more particularly if they are manufactured with low ribs, the spacer fabrics utilized in the present case are excellently suited for a measure which in the case of insulating elements generally leads to a substantial increase in the resistance values for thermal transition. The evacuation of the air volume in the intermediate space between the panes in order to minimize heat transition has already been mentioned supra. As is known even an extremely tight pane spacing of the order of size of the free mean path of the air molecules is sufficient.

Figure 5:
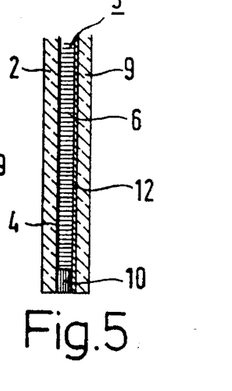

FIG. 5 shows such a design, which is characterized by special measures for ensuring thermal insulation in the pane element 1 in accordance with the invention. In order, in the case of evacuation of the intermediate space between the panes, to keep the thermal conduction via the rib fibers 6 within extremely tight limits, there is the proposal to utilize spacer fabrics 3 with a plurality of rib fibers 6 of minimum thickness, that is to say rib fibers with an extremely low fineness value, and with a minimum application of resin thereto.

It is particularly preferred to utilize spacer fabrics, which are designed in the form of a velvet, the spacer fabric employed here merely consisting of one covering layer 4, which is connected with the rib fibers extending from it and running perpendicularly to the covering layer. It is preferred to utilize velvet fabric layers with loops or cut loops with a height of 1 to 3 mm. By means of the sprayed on, cured resin, which is not illustrated here, the individual threads 6 are stiffened and caused to stand upright on the glass pane 2. The glass pane 9, which on the inside is preferably provided with a low E coating, is placed on a plurality of erected fibers 6 and after providing an air-tight edge seal by means of a surrounding adhesive rib 10 is pressed firmly against the fiber structure resting thereupon by evacuation of the so formed intermediate space between the panes. The plurality of erected, stiffened fibers prevents inward curvature of the panes under the load of the atmospheric pressure.

It is an advantage if the glass pane 9 is provided on the inside with a thin film 12 as well, which accepts the stiffened fiber ends in a fixing and force transmitting manner. In order if required to ensure the emission reducing effect of the low E coating arranged on the inside of the glass pane 9, it is necessary for the film 12 to consist of a material which is transparent for thermal radiation. Polyvinyl fluoride film with a thickness below 50 μm fulfill this condition. In the same manner it is furthermore possible for the fibrous covering layer 4 as well to be provided with a resin of a material which is transparent for thermal radiation, this being possible with all embodiments illustrated.

As regards the rib fibers 6 in order to reduce heat transition with any type of spacer fabric 3 it is possible to adopt the feature of dispensing with resin coatings for the mean height of the fiber ribs along a length of a few tenths of a millimeter in order to have an extremely thin fiber cross section at one position along the length of the fiber without any sacrifice as regards flexural rigidity and resistance to compression of the thread structure. In this respect the invention contemplates further reducing heat conduction by providing rib fibers with a low thermal conductivity, as for instance carbon or textile carbon fibers, or furthermore hollow fibers of such fiber materials.

The heat transition through the spacer fabric can be still further reduced by fully or at least partly designing the glass, synthetic resin or carbon fibers employed for the manufacture of the textile spacer fabrics as hollow fibers. Moreover, optical guide effects can be obtained or are at least favored by the use of hollow fibers even without additional sizes. The employment of hollow fibers further leads to a higher rigidity and elasticity of the spacer fabric. This facilitates the erection of the rib fibers or their automatic return to an upright position after the impregnation.

Further possible measures of the invention relate to a reduction in the heat transition or k values by avoiding high thermal radiation emission values. The high emission values of glass pane surfaces for thermal radiation are due to the high absorption capacity of glass for thermal radiation—the coefficient (e) of emission of glass is equal to 0.85—and in the room temperature range in the case of glass panes lead to a proportional thermal energy transition by radiation of approximately 65%.

Emission reducing coatings on glass (low E coatings) may consequently make a substantial contribution to improving the thermal insulation properties of insulating glass. Such coatings are however only effective if thermal radiation is able to be directly incident thereon. It is hence necessary for a medium transparent to thermal radiation, as for example a layer of air or a film material transparent to thermal radiation, to adjoin such layers.

The normal way of thinking behind highly effective insulating glass of conventional design of applying such coatings on the surfaces of the inwardly directed panes just because of their sensitivity to scratching, may not be directly adopted for the glazing element in accordance with the invention, since the inner surfaces of the covering panes are adhered to the resin coatings of the spacer fabrics and to this extent do not offer any surfaces open to radiation.

For the provision of the glass surfaces with low E coatings on the glazing element in accordance with the invention a different approach is necessary.

FIG. 6 shows a simple embodiment of a glazing element with an emission reducing coating. In the case of this simplified design the first proposal is to utilize a pane 2 with an external, pyrolytically applied low E coating 13 for the pane turned towards the interior of the building. Such pyrolytically applied coatings on glass to reduce emission of thermal radiation are considered to be scratch resistant and not influenced by atmospheric effects. The low E coating functions, if it is applied to the surface of the outer covering pane facing the interior of the building, in this case as a coating reflecting thermal radiation. From the point of view of the physics of the arrangement such coatings act reflectingly as regards the thermal radiation if they are turned towards the flux of heat. When applied to surfaces facing away from the thermal flux on the contrary they cut down the emission of thermal energy while providing the same useful effect.

Figure 7:
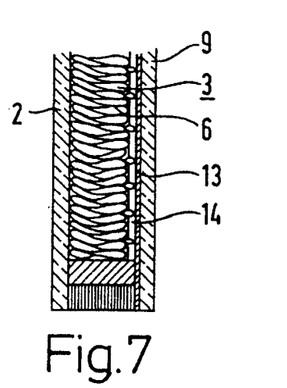

The conventional use of low E coatings in the case of insulating glass elements on a pane surface facing the space between the panes, may however be adopted for the pane elements 1 in accordance with the invention if further method steps are employed. In this case firstly the resin impregnated spacer fabric 3 is placed on the first covering pane 2 and introduced into a press, whose upper platen is designed on its inner face in the form of relief-like embossing plate. By means of the embossing plate a regularly shaped, proud line or dot grid pattern structure is embossed in the resin coating 7 of the upper covering fabric layer 5. The proud line or dot grid pattern is to amount to approximately 10 to 15% of the basic area and exceed the same in height by at least 1 mm. After curing of the embossed grid patterns the second covering pane 9, which is internally provided with a low E coating 13 is applied with an adhesive effect on such proud pattern surfaces 7 so that between the pane 9 and the recessed basic surfaces of the covering layer 5 a volume of air 14 with a height of at least 1 mm may be produced. An embodiment of the invention produced using such method steps with a low E coating on the inside is depicted in FIG. 7. It is naturally possible to use pyrolitic coatings in combination with coatings produced by vapor deposition in order to optimize the k value in one and the same insulating element.

The functional effectiveness of low E coatings applied internally to one or, respectively, both covering panes 2 and 9 may be also achieved by a suitable modification of the covering layers 4 and 5 of the spacer fabrics 3. For this case it is preferred to design the distance between the rib rows to be larger and the connecting covering layer for a smaller number of fibers so that the covering layers 4 and 5 adhering to the covering panes 2 and 9 have partly open areas and accordingly permit free glass areas.

As already mentioned in the case of all embodiments of the invention for wetting the covering coatings it is possible to employ resins which in a thin layer are completely or substantially transparent for the spectrum of thermal radiation.

Using the insulating glass element in accordance with the invention and given a high degree of evacuation of the intermediate space and simultaneously the provision of the element with low E coatings it is possible to obtain extremely high thermal insulation effects with k values of under 1.0 $W/m^2K$.

Figure 8:
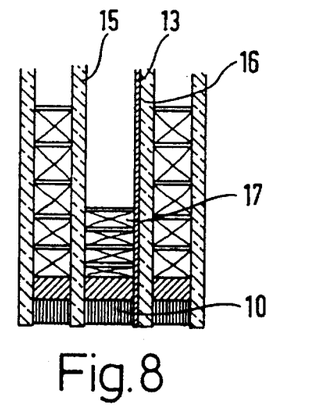

With the embodiment depicted in FIG. 8 it is possible to obtain even better thermal insulation values. This embodiment comprises a composite structure of two insulating glass elements, which are connected together at a distance of for example 12 to 20 mm by means of an edge seal 10 in a fashion similar to conventional twin pane insulating glass. The connection with one another of the inner panes 15 and 16 may also be performed in an advantageous manner using a marginally surrounding spacer fabric 17. In the case of such a composite structure involving two insulating glass elements there is then the possibility of arranging any necessary low E coatings 13, protected in a manner as with normal insulating glass, on the surfaces facing the intermediate space.

Figure 9:
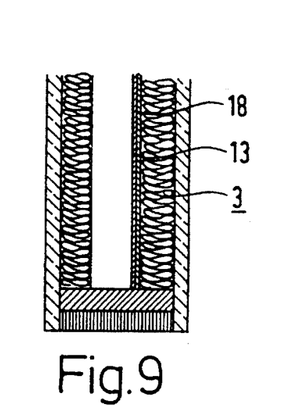

In an advantageous fashion it is possible, as shown in FIG. 9, to provide weight saving transparent synthetic resin sheets or, respectively, films 18 at the position of the panes 15 and 16 on the inside in order to cover over the spacer fabric 3. In this case as well it is possible to arrange low E coatings 13 protected in the intermediate space between the panes on the synthetic resin film 18.

Figure 10:
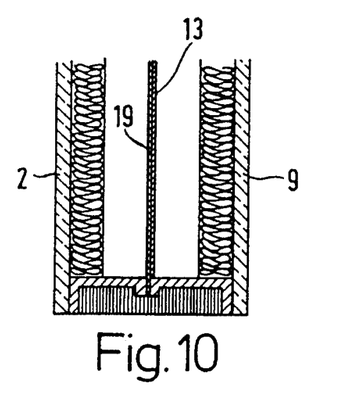

Furthermore in the case of such a composite element it is possible to completely dispense with a cover for the spacer fabric 3 facing the interior space on one or both sides. It would furthermore be an advantage in this case, as shown in FIG. 10, to provide a transparent glass or synthetic resin pane or, respectively, film 19 arranged in the intermediate space in parallelism to the panes 2 and 9, such pane or film 19 being provided if necessary with a low E coating 13 on both sides.

Figure 11:
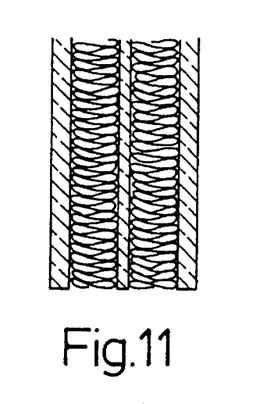

Sandwich elements of this type can be utilized with advantage in the form of large-area translucent building coverings extending for the height of a storey instead of opaque walls, in which respect in order to achieve the same thermal insulating effect it is only necessary to have a wall thickness of 40 mm, as opposed to wall thicknesses of 400 mm in the case of conventional opaque encasing means. The stability or strength of such elements may be increased by an additional edge composite structure using a surrounding spacer fabric band. It is naturally possible also to utilize multi-layer sheet structures in accordance with the embodiment depicted in FIG. 11 hereof.

Translucent wall elements with a large area may lead to excessive heating of rooms in the summer time when there is greater solar radiation, whereas in the winter and transitional periods strong solar radiation will contribute to heating rooms. If in the case of such elements one of the outer panes is replaced by an absorptive glass pane with a predominant effect in the non-visible part of the solar spectrum, such an insulating glass element, dependent on the way it is turned through 180°, will in summer provide a highly effective sunshade whereas in winter it will provide for complete utilization of available solar radiant energy for room heating.

When the element is in its summer position with the absorptive outer pane turned towards the sun, selectively at least 50% of the radiant solar energy, preferentially the radiation in the long wave length invisible spectral range, will be converted by the outer absorptive filter pane into heat energy. Owing to the high thermal resistance of the insulating pane element and the low E coating applied to the rear surface of the outwardly directed absorptive filter pane the heat energy will be predominantly lost to the outside atmosphere by convection or in the form of thermal radiation.

In the case of the winter setting of the element this effect, like the effect of a diode, will take place in the opposite direction. On turning the insulating glass element through 180° the absorptive filter pane will now be arranged on the room side. The solar radiation impinging on the wall element penetrates through the translucent insulating glass element with only a low transmission loss rate and impinges on the absorptive filter glass pane facing the interior of the building. The heat produced in this pane by absorption of the solar radiation will now flow practically completely into the interior of the building.

A control of the solar radiation may naturally be effected in a familiar manner using louvers, which in this case are accommodated and protected in an advantageous manner in the free space between the composite elements.

An obvious advantage of the glazing elements in accordance with the invention so far described is the low inherent weight of the structures, which may even be effected with a single pane of glass. Owing to their low inherent weight the glass elements in accordance with the invention may be utilized to span large distances without specially supported edge ledges.

Figure 12:
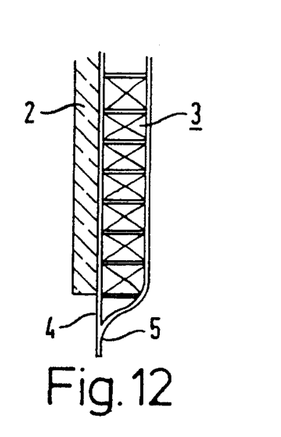

In the case of the embodiment depicted in FIG. 12 unlike other composite glass elements the possibility is taken advantage of that the glazing elements in accordance with the invention may be securely mounted without any operation on the pane members, which are likely to fracture, with an ample supporting action. For this purpose in the case of this embodiment the spacer fabric 3 adhering to the pane 2 is caused at the edge to project past the pane and may be designed as a ledge with suitable holding means.

Such a projecting ledge of the spacer fabric 3 may be pressed or be attached as a tape or band in some convenient fashion on holding rails by bonding, screwing or clipping.

Glass sandwich elements of this type with marginally projecting ledges as holding or attachment means may more particularly be utilized with advantage in connection with the glazing of facades and cladding walls. An attachment of the glass panes using ledges, projecting on all four sides, of the spacer fabric on supporting elements of the outer wall of a building leads to a reliable load bearing and elastic connection with glass elements having a large area. Stresses and distortion as normally caused by a rigid connection of the pane members with the support elements and which are unpleasing to the eye when beholding the facade, may be avoided with this type of attachment.

By means of projecting ledges of the spacer fabric it is possible not only to mount panes with large areas on support elements set in the wall masonry without stress but furthermore they may be connected together using laterally projecting ledges in strips and so as to lie in the same plane. In this respect it is an advantage that then the individual glass panes may be designed with groove and tongue connections like wood paneling.

It is particularly advantageous to use such thermal insulation translucent safety glass elements in a manner reducing weight and costs, with a glass covering coating on only one side thereof to serve as an insulating suspended facade arranged in front of the masonry for heating up the masonry by solar radiation. In the summer time it is possible for the action of the warmth on the masonry to be limited by letting off the hot air through an air passage constituted by spacer fabric with a suitable clearance therein. The same air passage is also suitable for the removal of moisture released by the masonry.

Even in the case of the use of toughened glass or composite safety glass, which may naturally be employed instead of float or cast glass for additional protection against injury in all designs and embodiments of the glass elements in accordance with the invention, such glass suspended facades which are both thermally insulating and use solar energy gains, are able to be produced at low costs in comparison with the presently conventional suspended facades arranged in front of the masonry of opaque insulating materials.

The glazing elements in accordance with the invention are translucent owing to the spacer fabrics. The solar radiation passing therethrough enters the room in a diffused form. Diffused solar light radiation provides a way leading towards better illumination of a room with decreased dazzle. By having thicker covering layers in the spacer fabrics it is possible for such effects to be correspondingly enhanced.

In order to increase the light incidence rate and therefore likewise increase the incident solar energy flux, it is proposed in this connection to design the rib fibers in a manner similar to light guide fibers, that is to say to provide the filaments, of which the fibers are made up, with layers with a higher refractive index.

Figure 13:
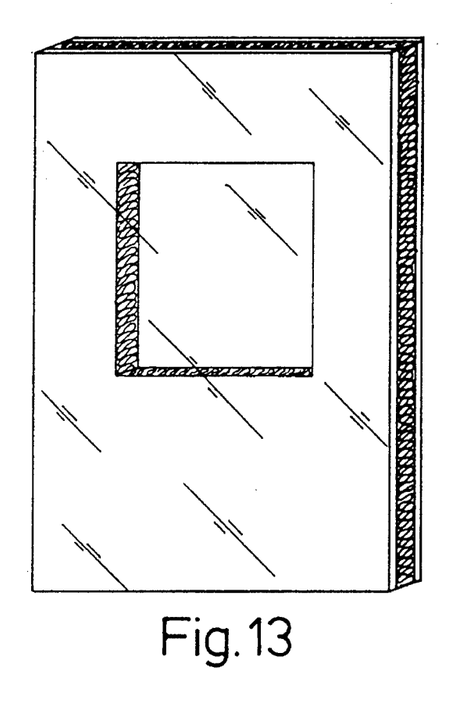
FIG. 13 and FIG. 14 diagrammatically show views of various spacer fabrics which are employed in glazing elements in accordance with the invention.
Figure 14:
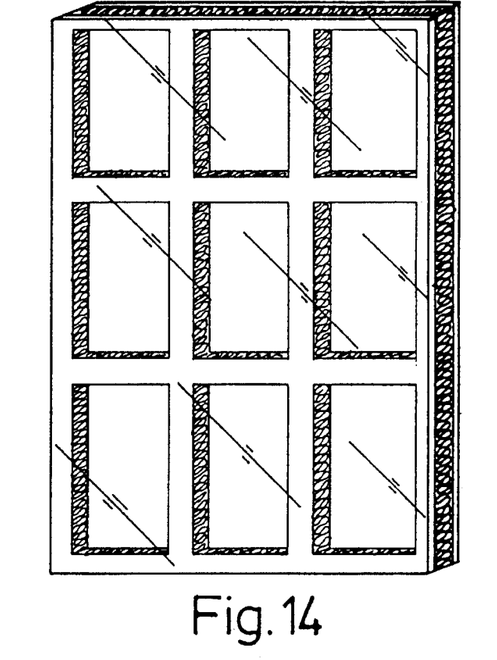

In the case of the embodiments depicted in FIGS. 13 and 14 there is a provision such that within the wall elements partly transparent surfaces are to be formed by suitable recesses in the spacer fabrics. Of the multiplicity of possibilities for the flat arrangement of transparent areas the design, illustrated in FIG. 14, of a completely transparent insulating glass element is to be particularly noted, in the case of which only the synthetic resin or aluminum ribs, arranged in the intermediate space between the panes, and which normally are to endow the window with a traditional appearance like a window composed of individual panes, is replaced by bands inserted with a suitable width, of spacer fabrics. The basic idea of the invention, that is to say connecting panes using spacer fabric to provide interlocked and force transmitting, flexural stiff flat members with thermal insulating properties, is adhered to. On the one hand such attachment prevents inward or outward bulging of the panes when owing to thermal effects there is an increase or a drop in the internal pressure and the effect of the bulge on the edge joint. On the other hand with the aid of the force transmitting ribs it is possible to withstand higher wind forces, since both panes are involved opposing the force. To this extent a smaller size of the pane thicknesses is possible.

Owing to the force transmitting coupling of the panes to the elastic ribs there is last but not least an enhancement of the acoustic insulating properties of the element. As compared with conventionally employed aluminum ribs furthermore the thermal insulating effect and the transmission of light of the insulating glass element is increased owing to the translucency of the ribs.

In the case of twin pane insulating glass elements so far the surrounding and sealing edge bond was not able, even in the case of small areas, to withstand the shear forces caused by the gravity of the panes. For this purpose a frame has so far been necessary. The areawise, structured attachment of the covering panes owing to the integrated intermediate ribs endows the insulating glass pane in accordance with the invention with dimensional stability so that it can be utilized without additional frame means as a monolithic element.

Figure 15:
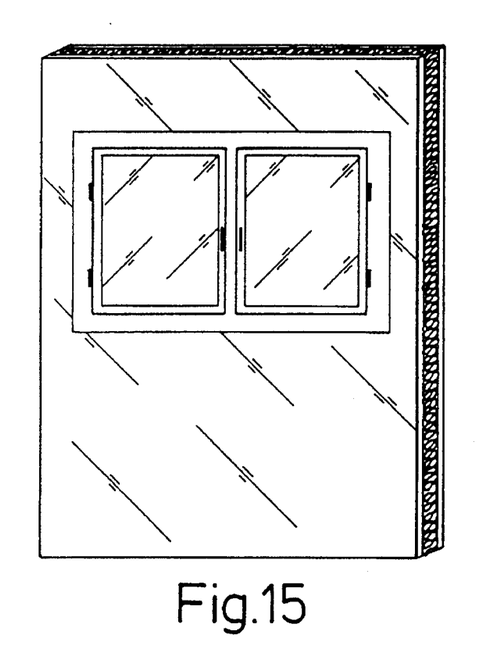
FIG. 15 is a diagrammatic elevation of a glazing element in accordance with the invention with an integral window element.

Lastly such a dimensional stable, translucent element, that is to say one allowing the passage of solar radiation, may also be employed with partial recesses, both in the spacer fabric and also in the transparent covering panes resting on either side thereof, in which decorative cover leaf frames may be integrated in order to receive window leaves in any suitable form as rocking, turning or reversible leaves. Such an element, which may be preferably designed as a wall element having the height of a storey with a turning mechanism not illustrated here, one of the covering panes being a selective, absorptive filter pane, is illustrated in FIG. 15. An advantage here is the use of the entire storey-high pane element as solar protective glass in the summer setting and as a highly efficient solar collector means in the winter setting without additional mechanical rotating means for the integrated window element.

For overhead glazing units fireproof glass is employed in many applications. In order to endow the glazing elements in accordance with the invention with fire resisting properties, the intermediate space between the panes remaining between the rib fibers is preferably filled with a fireproof material. A transparent gel of a polymer which has a highly hydrous, inorganic saline solution embedded therein is used as fireproof material in a fashion known per se. In case of fire, an insulating layer with high thermal insulating properties is formed from this material. In the process, energy is consumed by vaporization of the stored water.

I claim:

1. A glazing element comprising at least one pane having a pair of parallel major surfaces bordered by minor edge surfaces and a coating provided on a first one of the major surfaces of the pane and extends at least over a substantial part of the extent of the area thereof, said coating being composed of fibers extending parallel to the major surfaces of the pane; wherein the fiber coating is constituted by a first covering layer of a spacer fabric impregnated with resin and is connected in a force transmitting manner with said first major surface of the pane, the spacer fabric possessing at least one second coveting layer on an opposite side thereof from the first covering layer; and wherein said first and second covering layers are connected together by rib fibers which, after curing of the resin, are elastic and flexurally stiff, and which extend transversely in relation to the covering layers.

2. The glazing element as claimed in claim 1, wherein the rib fibers intersect with one another.

3. The glazing element as claimed in claim 2, wherein the intersection rib fibers are connected at their points of intersection by said cured resin.

4. The glazing element as claimed in claim 1, wherein the rib fibers have a mean fineness in a range of approximately 20 to 80 tex.

5. The glazing element as claimed in claim 1, wherein the rib fibers are arranged with a density of between approximately 10 and 60 fibers per cm².

6. The glazing element as claimed in claim 1, wherein the spacer fabric is made up of fibers of a material selected from the group consisting of glass, synthetic resin and carbon, and mixtures thereof.

7. The glazing element as claimed in claim 6, wherein the rib fibers comprise glass fibers provided with silane sizes.

8. The glazing element as claimed in claim 6, Wherein the fibers of the spacer fabric are constituted at least partly of hollow fibers.

9. The glazing element as claimed in claim 1, wherein said resin is selected from the group consisting of epoxy, polyurethane, phenol, and polyester resins, and mixtures thereof.

10. The glazing element as claimed in claim 1, wherein the covering layers of the spacer fabric are pressed together at edges in a manner forming a surrounding edge seal.

11. The glazing element as claimed in claim 1, further comprising receiving means embedded in the spacer fabric in a force transmitting manner for attachment of the glazing element on the outer surface of a building.

12. The glazing element as claimed in claim 1, wherein the spacer fabric extends past an edge of the first major surface.

13. The glazing element as claimed in claim 1, wherein at least one additional pane is arranged parallel to the pane, the spacer fabric being arranged in an intermediate space between the pane and said additional pane.

14. The glazing element as claimed in claim 13, wherein the second covering layer of the spacer fabric is connected with the additional pane in a force transmitting manner.

15. The glazing element as claimed in claim 1, wherein the covering layers of the spacer fabric are connected with the at least one pane by means of an adhesive film.

16. The glazing element as claimed in claim 15, wherein the adhesive film is selected from the group consisting of polyvinylbutyral and polyurethane.

17. The glazing element as claimed in claim 15, wherein fibers of a material selected from the group consisting of glass, synthetic resin and carbon are incorporated into the adhesive film.

18. The glazing element as claimed in claim 1, wherein the rib fibers are coated with a material having an index of refraction that is greater than that of the material of which the rib fibers are formed.

19. A glazing element comprising at least first and second transparent panes arranged with major surfaces thereof parallel to each other, and a fiber coating connected with one of the major surfaces of the first pane, said fiber coating being made up of fibers extending parallel to the major surfaces of the first pane; wherein the fiber coating comprises a textile spacer fabric that is impregnated with resin, said fabric comprising a covering layer and rib fibers extending transversely in relation to the covering layer, free ends of the fibers being arranged at the second pane.

20. The glazing element as claimed in claim 19, wherein the rib fibers are secured on the second pane by means of an intermediate coating.

21. The glazing element as claimed in claim 20, wherein the intermediate coating is constituted by one of a resin coating and an adhesive film.

22. The glazing element as claimed in claim 20, characterized in that the intermediate coating is constituted by a material which allows thermal radiation to pass therethrough.

23. The glazing element as claimed in claim 13, wherein a diffusion-tight edge seal is provided on the outer side of the spacer fabric.

24. The glazing element as claimed in claim 23, wherein the diffusion-tight edge seal is formed by a weld directly between the panes.

25. The glazing element as claimed in claim 23, wherein an intermediate space between the panes is evacuated.

26. The glazing element as claimed in claim 23, wherein an intermediate space between the panes is filled with a gas as a thermally insulating material.

27. The glazing element as claimed in claims 23, wherein an intermediate space between the panes is filled with a fireproof material.

28. The glazing element as claimed in claim 27, wherein the fireproof material comprises a transparent gel of a polymer which has a highly hydrous, inorganic saline solution embedded therein.

29. The glazing element as claimed in claim 22, wherein the rib fibers are free of resin at the mean height thereof.

30. The glazing element as claimed in claim 1, wherein a pane is radiation absorbent.

31. The glazing element as claimed in claim 1, wherein a low E coating is applied to a pane.

32. The glazing element as claimed in claim 31, wherein low E coating has been pyrolytically applied to an outer side of a pane.

33. The glazing element as claimed in claim 31, wherein the low E coating is applied to an inner side of a pane and adjoins a thermal radiation transparent substance.

34. The glazing element as claimed in claim 1, wherein the glazing element can be turned through 180°.

35. The glazing element as claimed in claim 13, wherein at least one additional pane is arranged in an intermediate space between the at least one pane and the at least one additional pane.

36. The glazing element as claimed in claim 35, wherein the at least one additional pane arranged in the intermediate space between the first and second panes is connected with at least one of the first and second panes by a spacer fabric in a force transmitting manner.

37. The glazing element as claimed in claim 35, wherein the at least one additional pane arranged in the intermediate space between panes comprises a synthetic resin sheet or film.

38. The glazing element as claimed in claim 35, wherein the at least one additional pane arranged in the space between the panes has a low E coating on at least one of its surfaces.

39. The glazing element as claimed in claim 1, wherein recesses are provided in the spacer fabric and constitute partly transparent areas.

40. The glazing element as claimed in claim 39, wherein the spacer fabric is formed of bands.

41. The glazing element as claimed in claim 1, wherein said glazing element forms a thermal insulating safety glass, for roof or overhead glazing arrangements, facade cladding or door elements, as a glass proof against breaking in or out or as acoustic insulating glass.

42. A method for the production of a glazing element comprising the steps of placing a resin impregnated spacer fabric having at least two coveting layers and rib fibers extending transversely in relation to the covering layers so as to cover a major surface of transparent pane to produce a laminated body in a pressing mold, compressing the laminated body so as to adhesively bond the pane to one of the covering layers of the fabric, whereafter the pressing mold is at least partially opened and the resin impregnated in the spacer fabric is cured.

43. The method as claimed in claim 42, further comprising the step of placing a second pane or sheet on the laminated body prior to said compressing step.

44. The method as claimed in claim 42, wherein, during the opening step, the pressing mold is opened a graduated amount until the desired distance is reached between the covering layers.

45. A method of producing a glazing element, comprising the steps of curing at least one partly resin impregnated spacer fabric having at least two covering layers and rib fibers extending transversely in relation to the coveting layers, and then, placing said at least one spacer fabric between two panes or sheets in a distance determining manner, pressing the panes or sheets with the spacer fabric therebetween with an adhesive bonding effect.

46. The method as claimed in claim 45, wherein the covering layers of the spaced fabric have a resin coating which is cured prior to resin coating of at least one of the rib fibers and an edge zone of the covering layers.

47. A method for the production of a glazing element, comprising the following steps:

a) pressing a resin impregnated spacer fabric, comprising a covering layer and rib fibers extending from the covering layer against a first pane in a bonding manner;

b) curing the resin and erecting the rib fibers in a rigid form;

c) laying a second pane on free ends of the rib fibers to form a pane structure; and d) providing the pane structure with a surrounding edge seal and evacuating the same.

* * * * *